(12) United States Patent
Thompson et al.

(10) Patent No.: US 6,690,855 B2
(45) Date of Patent: Feb. 10, 2004

(54) PLANAR WAVEGUIDE DISPERSION COMPENSATOR

(75) Inventors: George H B Thompson, Sawbrideworth (GB); James Whiteaway, Sawbridgeworth (GB); Terry Bricheno, Gt Sampford (GB)

(73) Assignee: Nortel Networks Limited, St. Laurent (CA)

( * ) Notice: Subject to any disclaimer, the term of this patent is extended or adjusted under 35 U.S.C. 154(b) by 132 days.

(21) Appl. No.: 09/902,362

(22) Filed: Jul. 10, 2001

(65) Prior Publication Data

US 2002/0102052 A1 Aug. 1, 2002

Related U.S. Application Data

(63) Continuation-in-part of application No. 09/739,528, filed on Dec. 15, 2000.

(51) Int. Cl.[7] .................................................. G02B 6/26
(52) U.S. Cl. ........................... 385/27; 385/28; 385/129
(58) Field of Search ............................... 385/11, 24, 27, 385/28, 37, 19, 123, 129, 132; 398/81, 87, 147, 148

(56) References Cited

U.S. PATENT DOCUMENTS

| | | | | |
|---|---|---|---|---|
| 5,136,671 A | * | 8/1992 | Dragone | 385/46 |
| 5,414,548 A | * | 5/1995 | Tachikawa et al. | 398/87 |
| 5,570,439 A | * | 10/1996 | Ido et al. | 385/37 |
| 5,940,548 A | * | 8/1999 | Yamada et al. | 385/14 |
| 6,137,604 A | * | 10/2000 | Bergano | 359/124 |
| 6,141,467 A | * | 10/2000 | Doerr | 385/24 |

FOREIGN PATENT DOCUMENTS

AU   WO-99/45420 A1 * 9/1999   ........... G02B/6/293

OTHER PUBLICATIONS

Hiroyuki Tsuda, Hirokazu Takenouchi, Takashi Kirokawa, and Katsunari Okamoto, "Performance Analysis of a Dispersion Compensator Using Arrayed–Waveguide Gratings", Journal of Lightwave Technology, vol. 18, No. 8, Aug. 2000, pp. 1139–1147.*

* cited by examiner

Primary Examiner—David V. Bruce
Assistant Examiner—Therese Barber
(74) Attorney, Agent, or Firm—Barnes & Thornburg

(57) ABSTRACT

A planar dispersion compensator for an optical signal is provided. The compensator decomposes an inputted optical signal into N component signals separated by a fractional wavelength $\delta\lambda$. Each component signal has its path-length adjusted to induce a sufficient phase shift between input and output to change the group delay of the optical signal when recombined from each of the component signals. In this manner, pulse broadening can be compensated by selectively varying the induced phase shifts to produce the desired level of opposite group delay. Portions of the substrate of the planar waveguide are removed to improve thermal responsiveness of the path-length adjustment means.

22 Claims, 12 Drawing Sheets

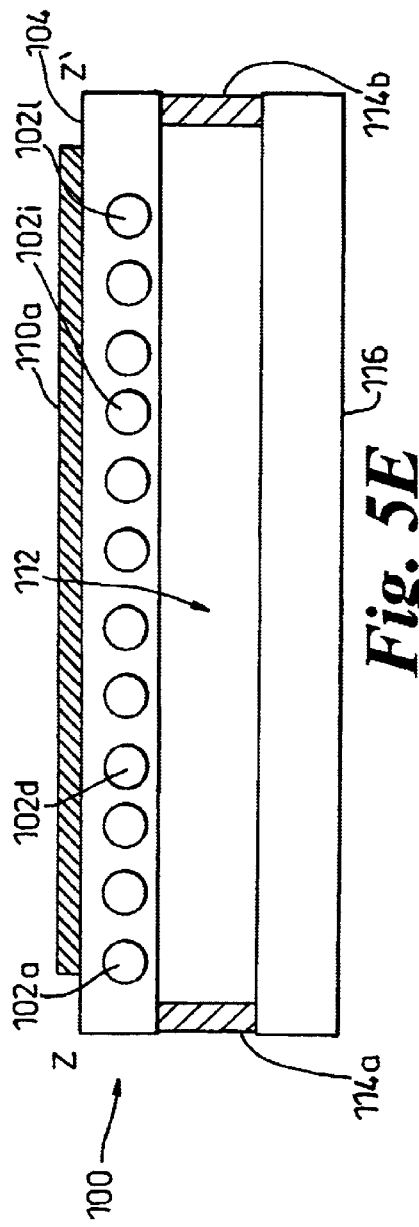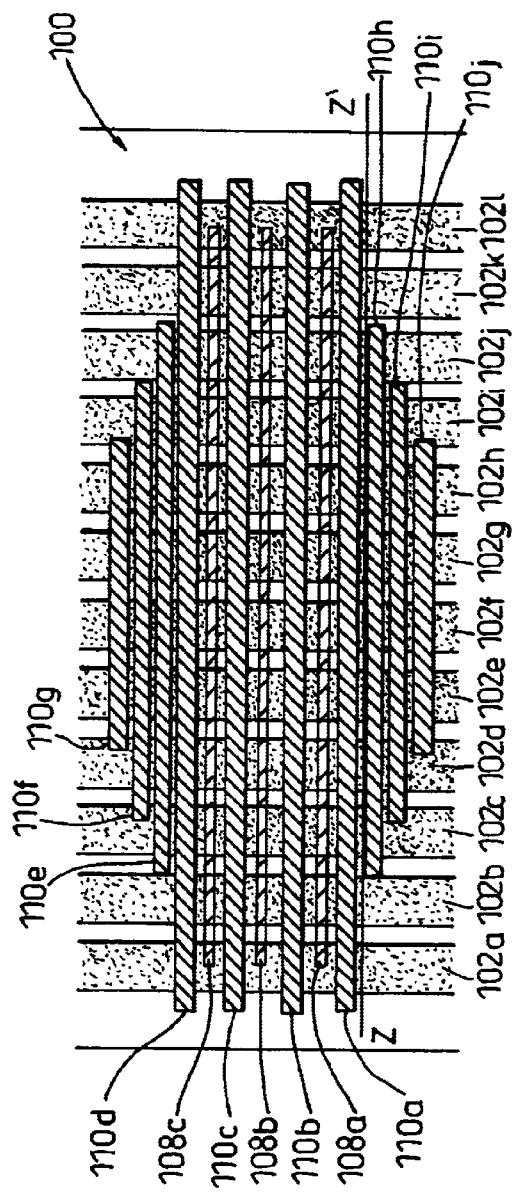

PLANAR WAVEGUIDE DISPERSION COMPENSATOR

RELATED APPLICATIONS

This application is a Continuation-In-Part of U.S. application Ser. No. 09/739,528 Filed Dec. 15, 2000 entitled 'Planar Waveguide Dispersion Compensator' from which this application claims priority.

FIELD OF THE INVENTION

The present invention relates to a planar waveguide dispersion compensator for an optical signal, and to a method for compensating for dispersion in an optical signal. Particularly, but not exclusively, the invention further relates to a thermally responsive lens providing dispersion compensation in a planar waveguide device, and to a method of tuning a thermally responsive dispersion compensator.

BACKGROUND TO THE INVENTION

Digital optical transmission systems such as glass fiber pulse code modulation (PCM) transmission systems are known to suffer from chromatic (wavelength dependent) dispersion. Such dispersion leads to optical signals propagating along a fiber or within a planar waveguide being subject to delays in their propagation time which depend on their wavelength. In this document, the term planar waveguide refers to an optical waveguide which is provided in a substantially integrated form such as in a planar light circuit, and which comprises a light-guiding region supported by a suitable substrate for example, a silicon or silica type substrate. In particular, the term planar waveguide encompasses a thin strip or film of material having a relatively higher refractive index which is embedded in the surface of a planar or laminar substrate.

The variable delay which chromatic dispersion generates in optical communications networks creates several problems, especially in digital optical transmission systems. As transmission rates increase in digital optical communications networks, providing cheap, reliable and efficient means to implement dispersion compensation and to control the pulse profile of an optical signal during transmission through optical media is highly desirable. By reducing the amount of dispersion in an optical signal higher bit rates can be more reliably accommodated.

The theoretical approach to preventing spread in a digital signal during transmission involves compensating for the variations in phase that arise from a frequency dependent group velocity in the transmission system.

Two ways in which a system may be constituted to compensate for dispersion are adding a length of line, for example an additional length of optical waveguide, of opposite dispersion characteristics to the previous portion of the line or applying a suitable phase-versus-frequency characteristic to the signal. Consider the case where a spectral component of a signal propagating along line 1 of length $z_1$ has angular frequency $\omega$. The spectral component has a propagation constant $\beta_1$ along line 1. Along an additional length of line, line 2 of length $z_2$, the spectral component has a propagation constant $\beta_2$. Either propagation constant $\beta_1$, $\beta2$ may be frequency dependent. If the initial, arbitrary, phase is $\phi_0$, then the phase at output is $\phi_1 = \omega t + \phi_0 - \beta_1 z_1 - \beta_2 z_2$.

The change of phase at a given frequency deviation $\delta\omega$ from the center frequency is given by $\{t - (d\beta_1/d\omega)z_1 - (d\beta_2/d\omega)z_2 - \beta_2(dz_2/d\omega)\}\delta\omega$. To prevent distortion of the signal, the phase variation should remain zero over the whole range of frequencies contained within it. As the $d\beta/d\omega$ and $dz/d\omega$ terms can vary over the frequency range, it is necessary that the second derivative with respect to frequency is also zero giving:

$$(d^2\beta_1/d\omega^2)z_1 + (d^2\beta_2/d\omega^2)z_2 +$$
$$\quad (1) \quad\quad\quad\quad (2)$$
$$2(d\beta_2/d\omega)(dz_2/d\omega) + \beta_2(d^2z_2/d\omega^2) = 0$$
$$\quad (3) \quad\quad\quad\quad (4)$$

The above equation shows three ways that are available for compensating group delay distortion in a fixed length $z_1$ of line 1 represented by term (1). Firstly, term (2), can provide compensation by adding line 2 of length $z_2$ of opposite group velocity dispersion. Secondly, term (3) can provide compensation when the length $z_2$ of line 2 is linearly dependent on the frequency. Thirdly, term (4) can provide compensation when the length $z_2$ of line 2 is a strongly quadratic function of frequency and dominates term (3).

A number of factors influence dispersion and delay and it is not easy to compensate in a planar waveguide device for the group velocity dispersion of the transmission system through which an optical pulse propagates. Although polymer materials can provide a compensating dispersion of group velocity, such materials are generally considered unsuitable for pulse reforming due to size constraints in a planar waveguide device. An optical pulse needs to have a relatively long propagation path within the polymer material to ensure that a sufficiently large compensating group delay dispersion is induced.

Another way to induce a compensating group delay dispersion for a signal is to linearly change the path-length of each component signal of a pulse to induce a sufficient relative change in phase with respect to the relative wavelength difference between the component signals. This is described by term (3) in the equation and can be achieved in non-planar optical environments for example, by using an adjustable chirped grating.

Conventional dispersion compensators using techniques such as stretchable chirped fibre gratings to alter the refractive index of the fibres implementing the grating are generally complex, expensive, and are subject to fatigue.

SUMMARY OF THE INVENTION

The invention seeks to obviate or mitigate the above problems by providing a dispersion compensator for an optical signal.

A first aspect of the invention seeks to provide a dispersion compensator for an optical signal comprising: optical signal input means to receive said optical signal as input; optical signal decomposing means connected to said input means and arranged to decompose the optical signal into a plurality of component signals, each component signal having a different passband from an adjacent component signal; optical dispersion means having an optical path-length adjuster arranged to receive each said component signal with an initial phase and configured to adjust the optical path length of at least one said component signal to induce a phase shift in said component signal on output; and an optical signal combiner arranged to re-combine the component signals output by said path-length adjuster into a re-combined signal, wherein the phase shift of each component signal is selected to correct in the recombined signal any dispersion present in the inputted optical signal.

Advantageously, the optical signal decomposition means is able to resolve said component signals sufficiently for said induced relative phase shift to provide a satisfactory level of dispersion compensation.

Advantageously, the invention enables a digital optical signal to receive compensation for any dispersion.

Preferably, said optical signal decomposing means comprises a first array of M waveguides and said optical dispersion means comprises a second array of N waveguides and said compensator further includes: a first 1:M coupler connected to said signal input means and splitting said inputted optical signal along said first array of waveguides; and a second M:N coupler connected to said first array of waveguides and to said second array of waveguides and arranged to decompose optical signals from said first array of waveguides into said component signals.

Preferably, said path-adjuster comprises at least one lens having a refractive index which is capable of differing from the refractive index of the waveguide along which a component signal is propagating.

Preferably, said dispersion compensator according to said first aspect is provided as a planar waveguide device, wherein the path-adjuster comprises at least one strip lens embedded in a first layer of said waveguide device, wherein each said strip lens has a refractive index which is capable of differing from the refractive index of the waveguide along which a component signal is propagating, wherein a heat channeling element is provided in a second layer below said first layer.

Preferably, the induced phase shift of each component signal is a quadratic function of the wavelength of each component signal.

Preferably, the signal combiner comprises said first coupler, the compensator further comprising a reflector arranged to reflect phase-shifted component signals back along their incident optical paths.

Alternatively, the signal combiner further includes: a N:P coupler connected to said path length adjuster and to a third array of P waveguides; and a P:1 coupler connected to said third array of waveguides and arranged to combine the phase shifted component signals into a single signal.

Preferably, the path length adjuster has at least one thermal characteristic affecting the path-length of at least one component signal, and the dispersion compensator further includes thermal control means controlling the path adjustment means.

Preferably, the dispersion compensator according to said first aspect further includes a polarization adjuster to adjust the polarization of the component signals.

A second aspect of the invention seeks to provide a method of compensating for dispersion in an optical signal comprising the steps of: decomposing the optical signal into component signals having differing passbands; inducing a phase-shift in each component signal by adjusting the optical path of each component signal relative to each other; and combining component signals into a combined optical signal, wherein the induced phase shift is selected, to provide a dispersion correction in said combined signal.

Preferably, the method according to the second aspect of the invention further includes the step of selecting the induced phase shift for each component signal to be a quadratic function of the wavelength of each component signal.

Preferably, the method according to the second aspect of the invention further includes the step of selecting the induced phase shift of each component signal to adjust the width of a pulse profile of the combined optical signal relative to the initial optical signal.

Preferably, the method according to the second aspect of the invention further includes the step of adjusting the phase of each component signal using thermally dependent path-length adjusting means to adjust the relative path-length of the component signals.

A third aspect of the invention seeks to provide an optical transmission system including a dispersion compensator for an optical signal, the compensator comprising: optical signal input means to receive said optical signal as input; optical signal decomposing means comprising at least one array of waveguides connected to said input means and arranged to decompose the optical signal into a plurality of component signals, each component signal having a different passband from an adjacent component signal; optical dispersion means having an optical path-length adjuster arranged to receive each said component signal with an initial phase and configured to adjust the optical path length of at least one said component signal to induce a phase shift in said component signal on output; and an optical signal combiner arranged to re-combine the component signals output by said path-length adjuster into a re-combined signal, wherein the phase shift of each component signal is selected to correct in the recombined signal any dispersion present in the inputted optical signal.

A fourth aspect of said invention seeks to provide a path length adjuster for a dispersion compensator, the path length adjuster comprising a plurality of planar waveguide strip lens, the strip lens comprising: a middle portion of substantially uniform thickness; and at least one end portion having a different thickness from said middle portion.

Preferably, at least one end portion of at least one strip lens has a stepped profile.

A fifth aspect of the invention seeks to provide a dispersion compensator for a pulsed optical signal comprising: an optical signal decomposer arranged to separate an inputted optical signal into a plurality of component signals having different passbands and optical paths; a path length adjustor arranged to adjust the optical path length of each component signal by a pre-determined amount; and an optical signal combiner to recombine said optical path-adjusted signals into a recombined optical signal, wherein the amount of optical path length adjustment is sufficient to provide a dispersion correction to said recombined optical signal.

A sixth aspect of the invention seeks to provide a dispersion compensator for a pulsed optical signal including: an optical signal decomposer arranged to separate an inputted optical signal into a plurality of component signals having different passbands and optical paths; a temperature responsive path length adjuster arranged to adjust the optical path length of each component signal by a pre-determined amount, temperature control means for said path length adjuster arranged to control the temperature of said path length adjuster; and means to recombine said optical path-adjusted signals into a recombined optical signal, wherein the amount of optical path length adjustment is sufficient to provide a dispersion correction to said recombined optical signal.

A seventh aspect of the invention seeks to provide a dispersion compensator for a pulsed optical signal comprising: an optical signal decomposer arranged to separate an inputted optical signal into a plurality of component signals having different passbands and optical paths; a path length adjustor arranged to adjust the optical path length of each component signal; and an optical signal combiner to recombine said optical path-adjusted signals into a recombined optical signal, wherein the optical path length adjustment provides a dispersion correction to said recombined optical signal.

An eighth aspect of the invention seeks to provide a planar waveguide dispersion compensator for a pulsed optical signal including, an optical signal decomposer provided within a silica layer of said planar waveguide and arranged to separate an inputted optical signal into a plurality of component signals having different passbands and optical paths; a temperature responsive path length adjuster arranged to adjust the optical path length of each component signal by a predetermined amount and provided in said silica layer; temperature control means for said path length adjuster arranged to control the temperature of said path length adjuster; a heat channeling element arranged to increase the amount of heat flowing from said temperature control means to said path length adjuster; and means to recombine said optical path-adjusted signals into a recombined optical signal, wherein the amount of optical path length adjustment is sufficient to provide a dispersion correction to said recombined optical signal.

A ninth aspect of the invention seeks to provide a method of thermally tuning a dispersion compensator according to any appropriate aspect of the invention, such as are apparent to a person skilled in the art, for example, the eighth aspect comprising the steps of:

a) thermally tuning said passbands of said decomposed signals; and b) thermally tuning said path length adjuster to adjust the optical path length to provide a desired level of dispersion correction.

Other aspects of the invention as set fourth in the priority document include providing a dispersion compensator for an optical signal comprising: an arrayed waveguide grating (AWG) having a number M of waveguides, the AWG decomposing the optical signal into N component signals each having a separation wavelength from an adjacent component signal; at least one path-length adjustment means varying the path-length of at least one of said N component signals to induce a phase shift between the initial phase of each component signal and the final phase of each component signal; and recombination means to re-combine the phase-shifted component signals into a re-combined signal, wherein the phase shift of each component signal is selected to adjust at least one characteristic of the optical signal in the recombined signal.

The dispersion compensator may further include an M:N coupler, wherein the arrayed waveguide grating is connected to the M:N coupler such each of the N component signals is carried along one of N waveguides.

At least one path-adjuster may comprise at least one lens having a refractive index which is capable of differing from the refractive index of a waveguide along which a component signal is propagating. At least one path-adjuster preferably comprises at least one strip lens having a refractive index which is capable of differing from the refractive index of a waveguide along which a component signal is propagating, and wherein at least one strip lens is thicker at either end than in a middle portion. Preferably, at least one characteristic is a group delay of the optical signal. Preferably, the phase shift $\Delta\phi$ of each component signal is a quadratic function of the wavelength of each component signal. At least one characteristic of the optical signal adjusted is preferably a width of a pulse profile of the optical signal. The phase shift $\Delta\phi$ of each component signal is preferably determined to induce an appropriate dispersion compensating group delay for the re-combined signal. Preferably, the recombiner comprises: a reflector capable of reflecting the phase shifted component signals; the reflector being provided so that the phase shifted component signals return along their incident paths. For example, the reflector may be a mirror or a partially silvered mirror(s). The recombiner may include a N:M coupler; an arrayed waveguide having a number M of waveguides, and M:1 coupler provided to combine the phase shifted component signals into a single signal. The path length adjuster may have at least one thermal characteristic affecting the path-length of at least one component signal, and the dispersion compensator may further include thermal control means controlling the path adjustment means. The dispersion compensator may further include a polarisation adjuster to adjust the polarisation of the component signals.

The dispersion compensator thus advantageously enables an optical signal which has undergone dispersion to be narrowed within an optical medium. By providing such a dispersion compensator as a planar waveguide device, the dispersion compensator is compact and easily integrated into optical components.

Another aspect seeks to provide a method of compensating for dispersion in an optical signal comprising the steps of: decomposing the optical signal into component signals which differ from each other by a fractional wavelength $\Delta\lambda$; adjusting the phase of each component signal by an induced phase shift $\Delta\phi$; and recombining each component signals into a re-combined signal, wherein the phase shift $\Delta\phi$ is selected to adjust at least one characteristic of the optical signal in the re-combined signal.

The method may further comprise the step of selecting the induced phase shift $\Delta\phi$ to determine a group delay dispersion of the re-combined signal. Preferably, the method further includes the step of selecting the phase shift $\Delta\phi$ to provide a different group delay dispersion for the re-combined signal to the initial group delay dispersion of the optical signal. Preferably, the method further includes the step of selecting the phase shift $\Delta\phi$ of each component signal to induce zero group delay dispersion in the re-combined signal. The method may further include the step of selecting the phase shift $\Delta\phi$ of each component signal to be a function of the wavelength of each component signal. The method may further include the step of selecting the phase shift for each component signal to be a quadratic function of the wavelength of each component signal. The method may further include the step of selecting the phase shift of each component signal to adjust the width of a pulse profile of the optical signal. The method may further include the step of adjusting the phase of each component signal using thermally dependent path-length adjusting means to adjust the relative path-length of the component signals. The method may further include the step of adjusting the polarisation of each component signal.

Other aspects seek to provide an optical component including a dispersion compensator according to any appropriate aspects of the invention, a node for an optical network including a dispersion compensator according to any appropriate aspects of the invention, and an optical transmission system including a dispersion compensator according to any appropriate aspect of the invention.

Other aspects also include a planar waveguide dispersion compensator for an optical signal which applies a phase shift $\Delta\phi$ to the optical signal, where the phase shift $\Delta\phi$ is a function of the wavelength of the optical signal, and wherein the phase shift $\Delta\phi$ is selected to adjust at least one characteristic of the optical signal in the re-combined signal. Any features of the above features may be suitably combined and/or incorporated in any of the above aspects as would be apparent to a person skilled in the art. Moreover, terms such as adjuster are to be construed to include appropriate equivalents capable of acting as an adjuster as would be obvious to those skilled in the art. Similarly, terms such as re-combiner are to be construed to include appropriate equivalents capable of acting as a signal recombiner.

The invention thus provides a planar dispersion compensator for an optical signal. The compensator decomposes an inputted optical signal into N component signals separated by a fractional wavelength $\Delta\lambda$. Each component signal has its path-length adjusted to induce a sufficient phase shift between input and output to change the group delay dispersion of the optical signal when recombined from each of the component signals. This behaviour is described by term (4) in the equation presented herein above. In this manner, pulse broadening can be compensated by selectively varying the induced phase shifts to produce the desired level of opposite group delay dispersion.

Advantageously, the dispersion compensation mechanism provides a means of inducing a group delay dispersion opposite to that of an optical signal in a relatively compact area. This is particularly advantageous in optical networks which carry traffic at high transmission rates. In any high-bit rate environment it is highly advantageous to be able to compensate signal dispersion in a reliable and compact manner.

By compensating for dispersion in the optical layer, both passive or active dispersion compensation can be implemented i.e. the amount of compensation may be predetermined (passive) or actively adjusted. Another advantage of the invention is that the invention can be implemented in a planar optical device.

The invention enables digital optical signal processing which comprises one or more instances of apparatus embodying the present invention, together with other additional apparatus.

By using the differential thermal response of different materials in a planar AWG, the mechanical strain/stress mechanisms such as stretchable chirped fibre gratings employ can be avoided.

BRIEF DESCRIPTION OF THE DRAWINGS

In order to show how the invention may be carried into effect, embodiments of the invention will now be described by way of example only and with reference to the accompanying figures in which:

FIGS. 5E and 5F show front and plan views at the embodiment shown in FIG. 5C respectively.

DETAILED DESCRIPTION OF INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Figure 1A:
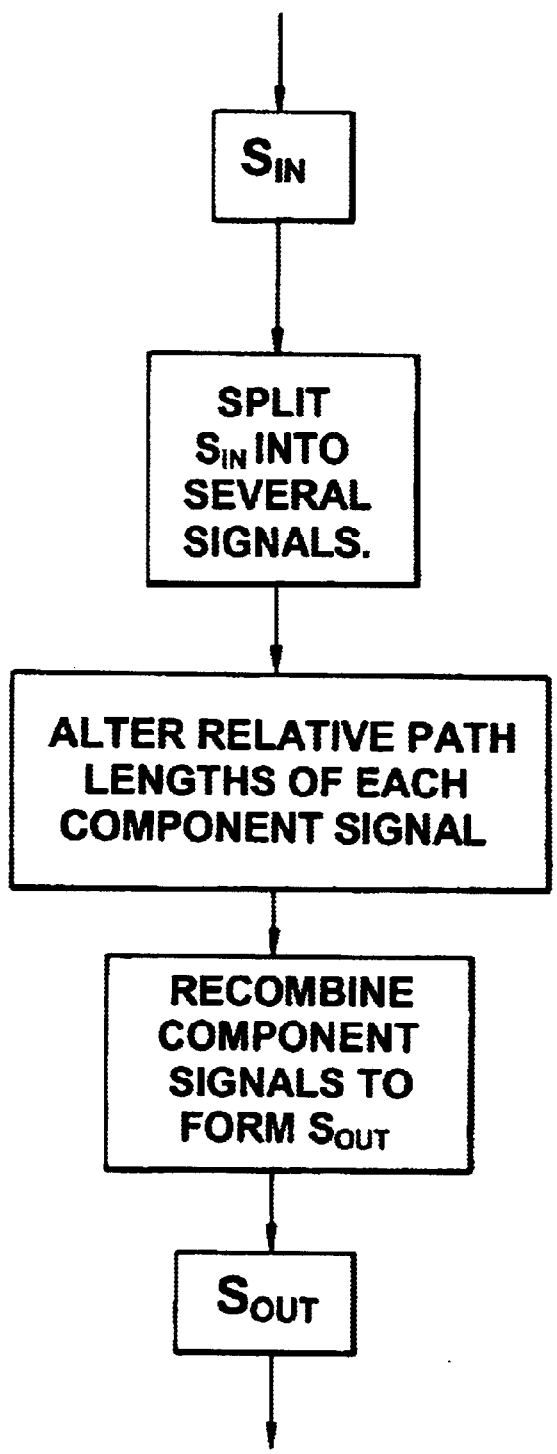
FIG. 1A shows a flow chart illustrating the basic principles of the invention.

FIG. 1A illustrates a method of providing dispersion correction for an optical signal according to the invention. An optical signal $S_{in}$ is input into a dispersion compensator and is split into a plurality of signals enabling $S_{in}$ to be separated into a number of component signals $S_a$, $S_b$ etc. The component signal $S_a$, $S_b$ each have different wavelength passbands and follow different optical paths.

The lengths of the optical path of each component signal are then adjusted according to the type of dispersion correction required. Once the path lengths of the component signals have been adjusted relative to each other by the required amount, the component signals are recombined such that the output signal $S_{out}$ exhibits the required amount of dispersion correction.

It will be appreciated by those skilled in the art that the extent to which dispersion correction is provided in such a system requires $S_{in}$ to be adequately decomposed into a sufficient number of signals. This requires the optical signal decomposing means used to have a sufficiently high resolution. The number N of component signals is critically dependent on the bandwidth of the input signal $S_{in}$. It is determined by the maximum phase difference that can be tolerated between component signals $S_{a,b,c}$ etc. at the edge of the band. The allowable wavelength interval between component signals decreases inversely with the bandwidth of Sin. Hence the total necessary number of component signals increases as the square of the bandwidth. The larger N is in any physical implementation, the better the physical dispersion compensation. Preferably, N is in the range 25 to 100 for effective dispersion control over a typical bandwidth however N is not limited to this range. It is also important that appropriate path length adjustment means are provided to ensure that an adequate level of the dispersion correction can be provided. The component signals $S_{in}$ each emerge from the path length adjustment means with a sufficiently distinguished phase shift $\Delta\phi$ relative to each other to ensure that overall, when recombined into an output signal $S_{out}$, the group delay dispersion of $S_{out}$ has been suitably adjusted to provide an appropriate level of dispersion correction.

Figure 1B:
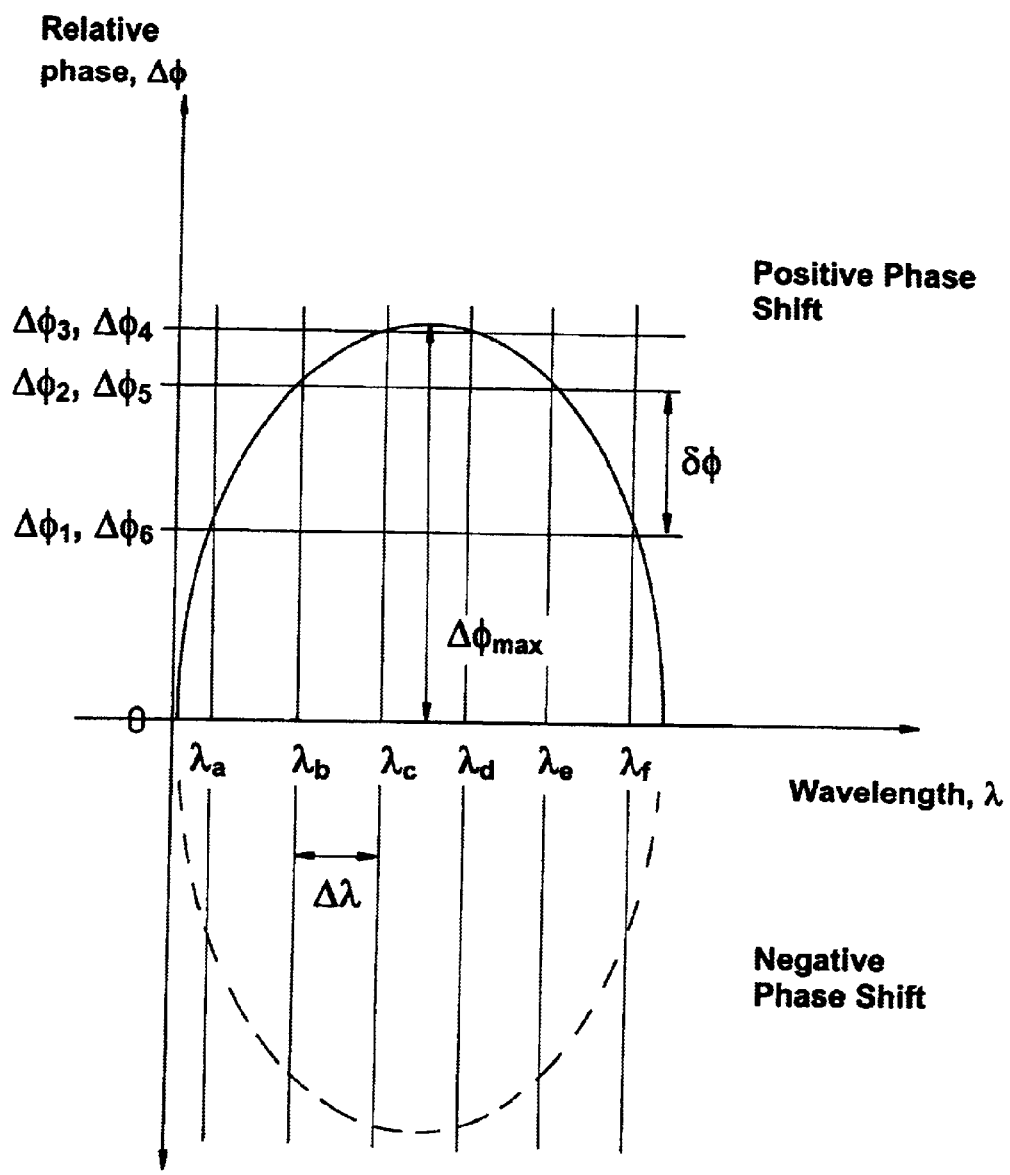
FIG. 1B shows a sketch illustrating the relationship between the component wavelengths and the induced phase $\Delta\phi$ shift according to the invention.

FIG. 1B illustrates the relationship between the relative phase shift $\Delta\phi$ induced by the path adjustment means for the component signals to provide a desired dispersion correction response. Here $\Delta\phi_n=\phi_n-\phi_o$ for each component signal $S_n$, where $\phi_n$ is the final phase delay of output component signal $S_n$, and $\phi_o$ is the final phase delay of one particular, reference component signal, here, for example the outermost component signal in the array. As FIG. 1B shows, the relative phase delays of the component signals at the point where they are recombined to form $S_{out}$ display a parabolic relationship with respect to the wavelength. It will be appreciated that a smooth curve is shown in FIG. 1B, whereas in a physical device a discrete set of points would be plotted showing the relationship between the passband for each component signal and the relative phase shift induced.

Each passband for each component signal is determined by the sensitivity and accuracy of the means used to separate out the component signals, FIG. 1B illustrates the relationship between the relative phase shifts $\delta\phi$ between adjacent passbands, the total induced phase shift $\Delta\phi$, and the wavelength spacing between component signals $\Delta\lambda$.

The upper curve in FIG. 1B illustrates the phase relationship when positive $\Delta\phi$ provides positive dispersion compensation, the lower curve shows how if a negative $\Delta\phi$ is induced, negative dispersion can be induced. To ensure dispersion corrected optical pulses are not shifted off-center, the path-length adjustment providing the dispersion compensation is symmetrical with respect to the component signals. Moreover, in the best mode for dispersion compensation, the total induced phase-shifts $\Delta\phi$ are symmetrical with respect to the wavelength of the component signals such that the total induced phase-shifts $\Delta\phi$ are a quadratic function of the component signal wavelength $\lambda$ (see, for example, FIG. 1B of the drawings).

Figure 2A:
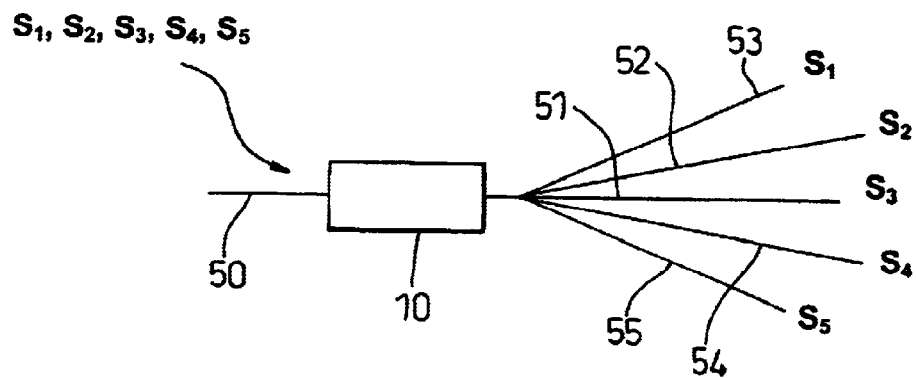
FIGS. 2A and 2B show sketches of alternative optical environments implementing the invention.
Figure 2B:
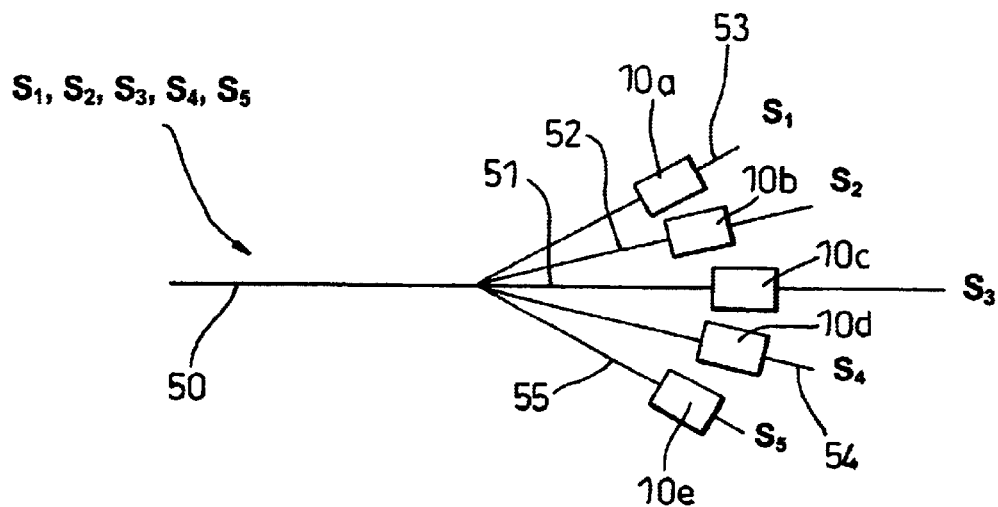

The dispersion characteristics of the dispersion compensator repeat at a wavelength interval equal to the free spectral range of the waveguide array. Therefore such a dispersion compensator is able to provide compensation for a number of optical signals which have been multiplexed together, providing the channels for each signal are equally separated from each other in optical frequency and the free spectral range is designed to suit. In this manner either a single dispersion compensator can be deployed within an optical network to compensate for several of optical signals $S_{in}$ if the required compensations are identical, or a set of dispersion compensators can be used (with appropriate settings which may differ) if the required compensations differ. In this way, a dispersion compensator is provided which can be deployed at various points within an optical network enabling identical dispersion compensators to be provided in a variety of optical environments. FIGS. 2A and 2B both show an optical network in which $S_{in}$ comprises several signals $S_1$, $S_2$, $S_3$, $S_4$, $S_5$ which are input in a multiplexed form into the dispersion compensator 10 along channel 50. The signals $S_1$, $S_2$, $S_3$, $S_4$, $S_5$ are separated in optical frequency from each other. Each signal $S_1$, $S_2$, $S_3$, $S_4$, $S_5$ is eventually to be demultiplexed and carried along a separate channel 51, 52, 53, 54, 55.

If each channel 51, 52, 53, 54, 55 is equally separated from its neighbours in optical frequency then a single dispersion compensator 10 which has a free spectral range equal to the channel frequency separation can be implemented as FIG. 2A sketches. In FIG. 2A, the dispersion compensator 10 is implemented on a single channel 50 capable of carrying a multiplexed signal prior to the signals being demultiplexed into a number of channels 51, 52, 53, 54, 55. This embodiment is suitable if the dispersion of each signal on the multiplexed signal, and/or the distortion in each channel 51, 52, 53, 54, 55 is the same.

FIG. 2B shows that otherwise a separate dispersion compensator 10a, . . . , 10e needs to be implemented for the demultiplexed signals $S_1$, $S_2$, $S_3$, $S_4$, $S_5$ on each channel 51, 52, 53, 54, 55 and appropriately tuned to compensate for the individual dispersive properties of each channel. However, if the free spectral range of the dispersion compensation is equal to the channel spacing, identical components can be used in each channel.

Figure 3A:
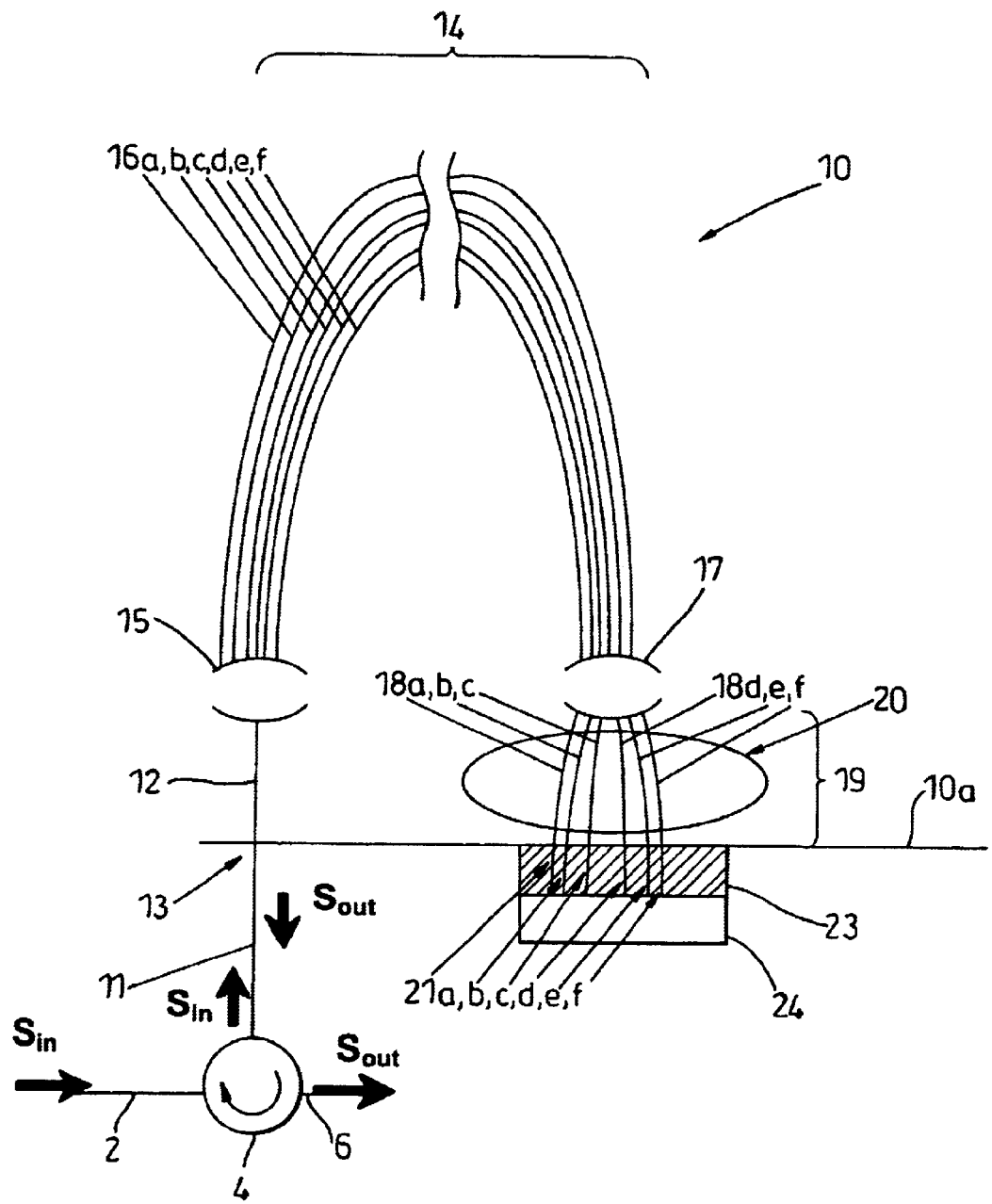
FIG. 3A shows a sketch of a dispersion compensator according to the invention.

FIG. 3A is a sketch of an optical dispersion compensator 10 according to a first embodiment of the invention, in which a dispersion compensator is incorporated into an planar optical waveguide device. Optical signal(s) $S_{in}$ travel along optical channel 2 and pass through optical circulator 4 to optical channel 11. Reference to a single $S_{in}$ will be made for clarity from now on, although as mentioned above, a single dispersion compensator is able to compensate for a plurality of $S_{in}$, if the $S_{in}$ are separated appropriately in frequency. The optical signal $S_{in}$ typically is a pulsed optical signal, and in particular may be a high-speed digital optical signal, for example, a signal with a transmission rate exceeding 10 Gbits/s.

In the embodiment shown in FIG. 3A, the dispersion compensated optical signal $S_{out}$ is output also along optical channel 11 and is directed by the circulator 4 out along optical channel 6. It will be apparent to those skilled in the art that in alternative configurations of the invention, such as FIG. 4B of the accompanying drawings shows, the compensated signal $S_{out}$ may be outputted by the dispersion compensator along another optical channel. It will also be appreciated that $S_{out}$ may be compensated for dispersion either positively or negatively according to the invention.

In FIG. 3A, the optical signal $S_{in}$ is received by the planar waveguide dispersion compensator 10 from channel 11 via optical port 13. $S_{in}$ is input into an arrayed waveguide grating (AWG) 14 suitably configured to decompose $S_{in}$ into a number of component wavelengths. This is achieved by the path lengths of the waveguides 16a, . . . , f in the array differing such that at the output of the array 14 the phase difference between the different signals generates interference, and it is possible to extract a number N of component signals $S_a$, $S_b$ etc, of $S_{in}$, where each component signal has a different passband.

In FIG. 3A, $S_{in}$ is input along waveguide 12 which is connected to an arrayed waveguide grating (AWG) 14 via a first 1:M multiport coupler 15, and several $S_{in}$ are output to a second multiport M:N coupler 17 which is connected to the first coupler 15 by the first array of waveguides 16a, . . . , f. It will be apparent to those skilled in the art that in a physical device M is usually a large number, for example of the order of $10^2$, however, for clarity M=6 in FIG. 3A.

Figure 3B:
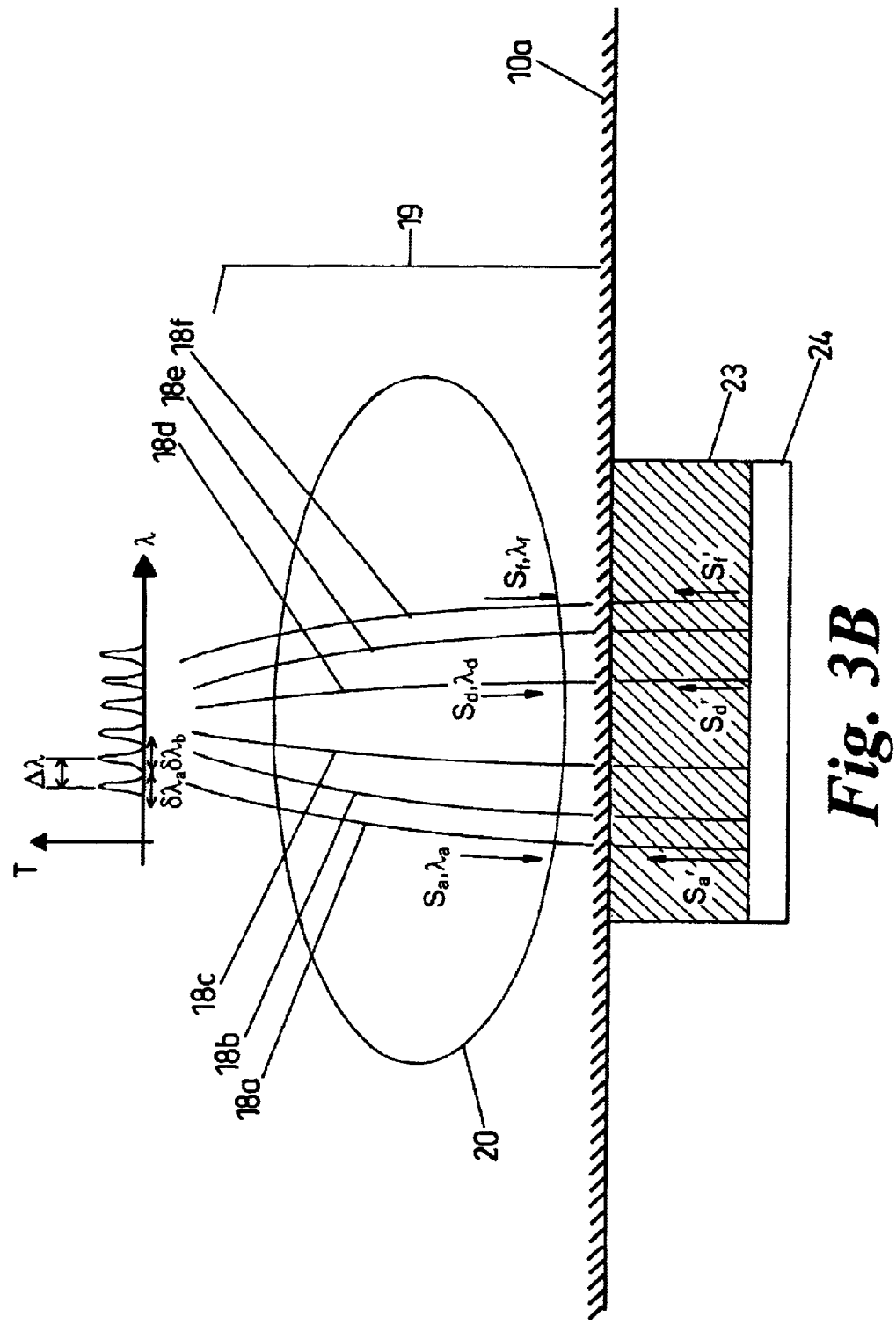
FIG. 3B shows a detail of FIG. 3A.

The decomposition of $S_{in}$ may be alternatively achieved using other passive and/or active means. For example, using transmission or reflection gratings. Returning again to FIG. 3A, the second multiport coupler 17 receives the M input $S_{in}$ signals and outputs N component signals $S_a$, $S_b$, $S_c$, $S_d$, $S_e$, $S_f$. Each signal $S_a$, etc, then propagates along one of N waveguides 18a, . . . , f. The wavelength passband for each component signal, (as the top of FIG. 3B shows), is $\delta\lambda$ and each component signal has a peak or central passband wavelength is separated from the peak or central adjacent central passband wavelength by a predetermined interval $\Delta\lambda$. Passbands repeat at wavelength intervals of the free spectral range $\Im_s$ of $S_{in}$ which is controlled by the pathlength difference of adjacent arms of the AWG. For clarity, the overlap in wavelength of the passbands $\delta\lambda$ is not shown in FIG. 3B.

The free spectral range $\Im_s$ is determined to be appropriately greater than the operational signal bandwidth, i.e., the bandwidth of the signal $S_{in}$ input to the AWG 14 along channel 12. The relationship between $\Im_s$ and the operational signal bandwidth will be affected by where the dispersion compensator device 10 is positioned in an optical network, and/or the type of signal which forms $S_{in}$ such as was discussed hereinabove with reference to FIGS. 2A and 2B.

FIG. 3B shows in more detail the dispersion compensating region 19 of the dispersion compensator of FIG. 3A and shows how the component signals $S_a$, $S_b$, $S_c$, $S_d$, $S_e$, $S_f$ are fed into a path length adjustor 20 in the dispersion compensating region 19. Each of the N wave-guides 18a, ..., f carries a component signal having a narrow passband $\delta\lambda_{a,b,c,d,e,f}$ and which has a dominant wavelength $\lambda_{a,b,c,d,e,f}$. Within the dispersion compensating region 19, the path length adjuster 20 adjusts the optical paths of each component signal to introduce a relative phase change $\delta\phi$ between pairs of adjacent dominant wavelengths $\lambda_a$, $\lambda_b$, $\lambda_c$, $\lambda_d$, $\lambda_e$, $\lambda_f$ such as FIG. 1B. This is discussed in more detail herein below.

The path length adjuster 20 typically comprises an arrangement of strip lens such as are described in more detail later with reference to FIGS. 5A to 5F.

In FIGS. 3A and 3B signals $S_a$, $S_b$, $S_c$, $S_d$, $S_e$, $S_f$ emerge from the dispersion compensating region 19 along the waveguides 18a, ..., f and are output from the planar waveguide device 10 along optical ports 21a, ..., f. The emerging signals $S_a$, $S_b$, $S_c$, $S_d$, $S_e$, $S_f$ are reflected back into the dispersion compensating region (reflected signals $S_a'$, $S_b'$, $S_c'$, $S_d'$, $S_e'$, $S_f'$). To ensure that the emerging signals $S_a$, $S_b$, $S_c$, $S_d$, $S_e$, $S_f$ and reflected signals $S_a'$, $S_b'$, $S_c'$, $S_d'$, $S_e'$, $S_f'$ are aligned appropriately with optical ports 21a, ..., f an index matched medium 23 is provided at the boundary of the planar waveguide device 10a, for example, a gel or fluid, which mitigates the effect of any boundary roughness. To reflect the signals, a suitable reflector 24 is provided adjacent the index matched medium 23, for example a suitable prism or mirror arrangement. In such an arrangement the mirror may be any suitable device, and may be partially or fully reflecting as appropriate for any particular implementation.

The reflected component signals travel back through the path-length adjusting means 20 along wave-guides 18a, ..., f and are combined by the coupler 17 into a plurality of re-combined optical signals which travel through the AWG 14. The plurality of optical signals are then combined into an output signal $S_{out}$ by coupler 15 which travels back along channel 12 to the optical port 13 where it emerges from the planar dispersion compensator 10. In this embodiment of the invention, an optical circulator is incorporated at the input so that the returning signal $S_{out}$ is directed away from the input path into a separate output channel 6.

It will be appreciated by those skilled in the art that numerous variations and alternative embodiments of the invention exist which provide dispersion compensation. Two such alternative embodiments are sketched in FIGS. 4A and 4B, where like components to the components illustrated in FIGS. 3A and 3B retain their numbering scheme.

Figure 4A:
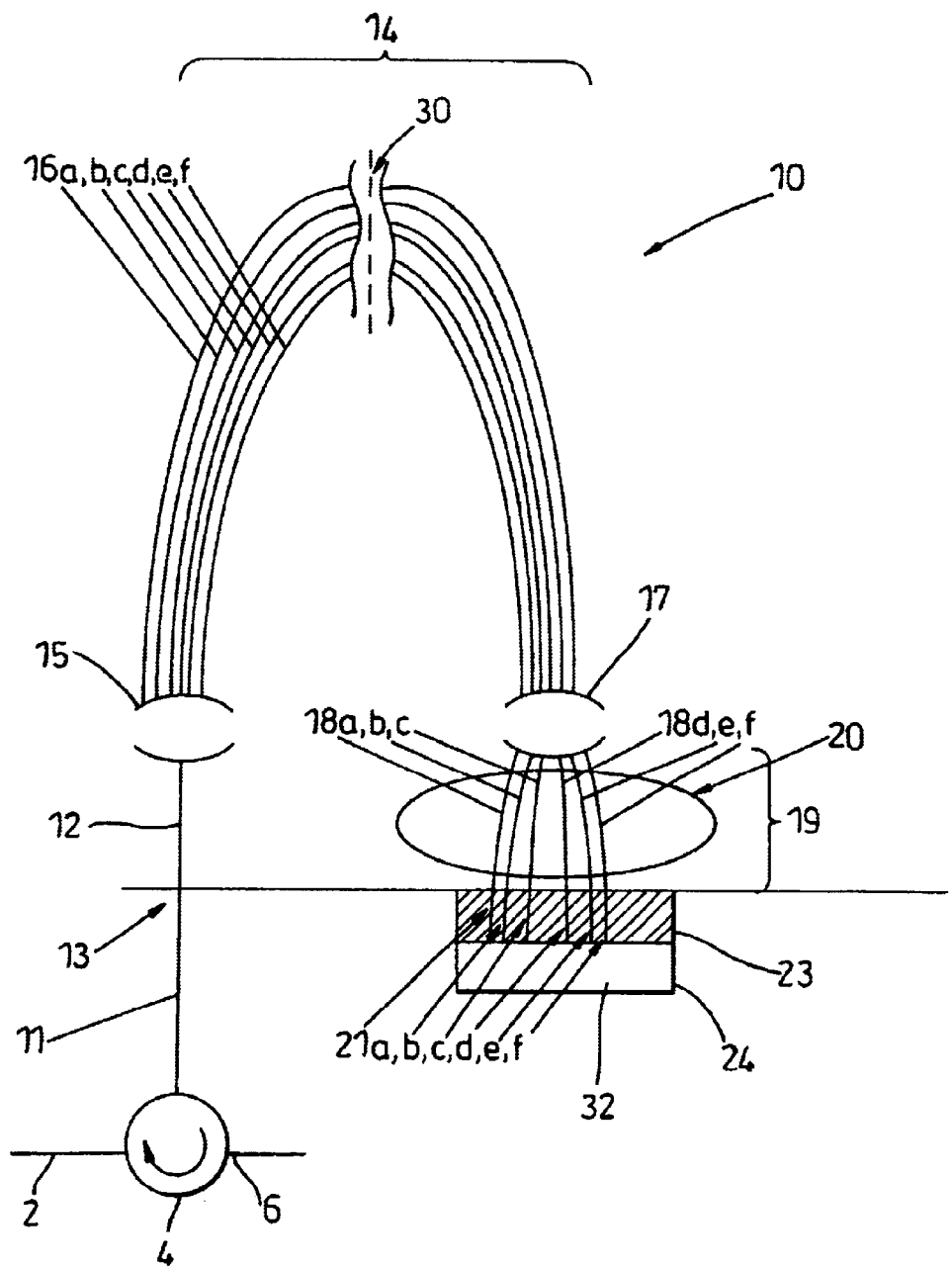
FIGS. 4A and 4B show sketches of alternative embodiments of dispersion compensators.

In the alternative embodiment shown in FIG. 4A, a half wavelength plate 30 is included to rotate through 90° the polarization of signals propagating along waveguides 16a, ..., 16f, and/or other polarization rotating means 32 are included adjacent to mirror 24. The other polarization rotating means may, for example, comprise a quarter-wavelength plate set at 45° to the horizontal plane of symmetry of the signals in the waveguide to rotate the reflected signals in total through 90°.

Figure 4B:
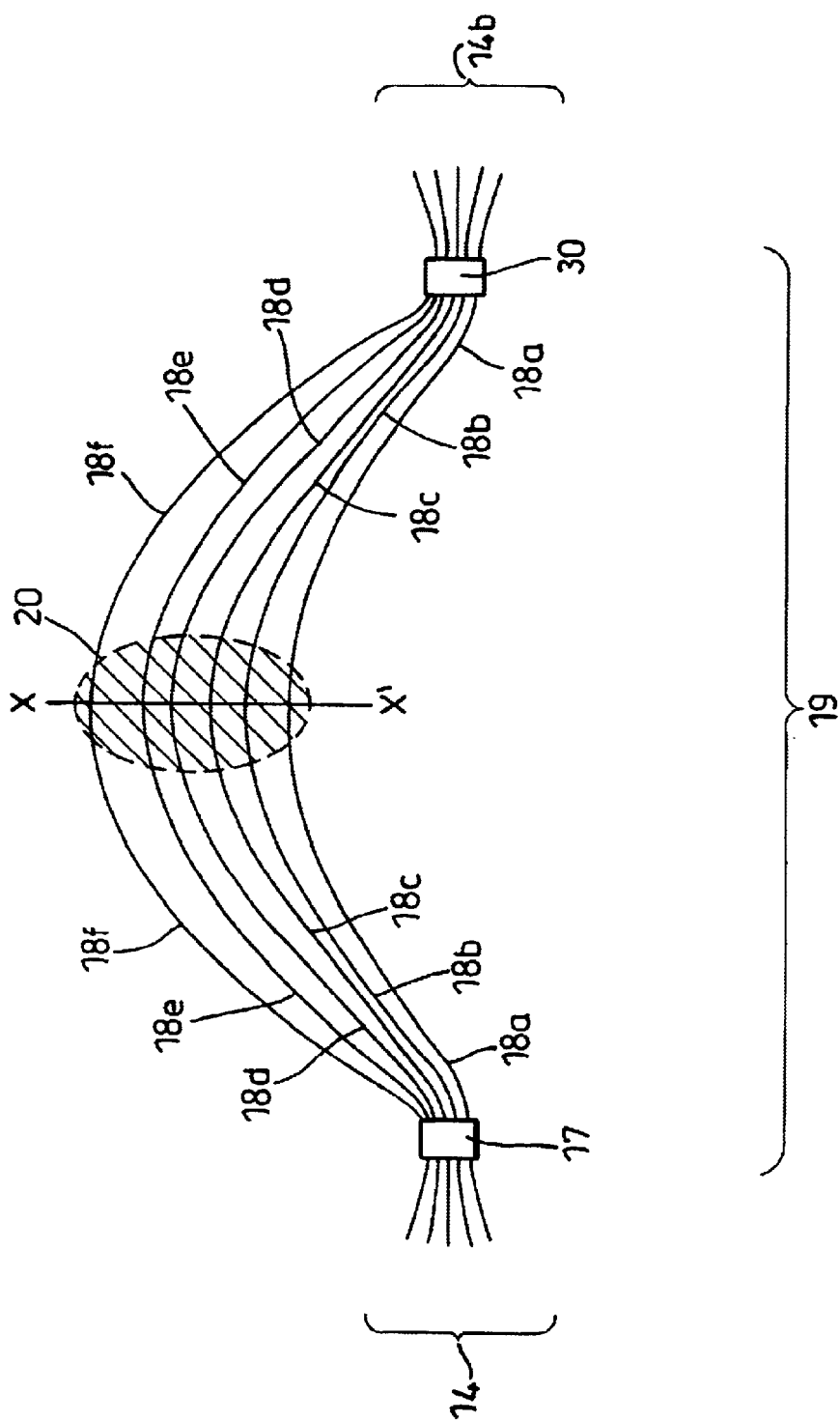

In the alternative embodiment of FIG. 4B, a reflecting mirror 24 is not provided, and a N:M coupler 30 feeds the component signals emerging from the dispersive region 19 into a second AWG 14b which has matched characteristics to that of the first AWG 14. The device illustrated in FIG. 4B can be considered to be mirrored along line XX', such that each half of the device is a mirror image of the other half.

Alternatively the waveguide array 18a, ..., f in dispersion region 19 may be replaced by an array of adjustable MEMS mirrors which, when appropriately actuated, will split the signal into N reflective components of suitable varying phase.

The operation of a planar waveguide dispersion compensator according to the invention will now be described in more detail. Each waveguide 18a, ..., f carries a component signal $S_a$, $S_b$, etc such that its dominant wavelength $\lambda_b = \lambda_a + \Delta\lambda$, where $\Delta\lambda$ is the wavelength spacing between adjacent waveguides. As a result of group delay distortion during transmission, each component signal is received by a waveguide 18a, ..., f at a fractionally different time from its neighbours, such that each component signal $S_a$, ..., $S_f$ has a fractionally different phase $\delta\phi$ from the adjacent component signal that varies with wavelength.

As each signal passes through the path-length adjusting means 20, dispersion compensation is provided by adjusting the phase of each signal by an induced relative phase shift $\Delta\phi$ which varies symmetrically outwards from the centre of the array.

As the number N of waveguides 18a, ..., f increases, the wavelength between adjacent waveguides ($\Delta\lambda$) can be selected to be sufficiently small for the group delay $\delta\phi/\Delta\lambda$ to be substantial. For a quadratic variation in the induced $\Delta\phi$, such as FIG. 1B sketches, the relatively small induced changes in phase shifts $\delta\phi$ between adjacent component signals can induce a substantial change in group delay, due to the relative small size of $\Delta\lambda$.

By selecting a small enough $\Delta\lambda$, i.e., by using a fine enough grating, an optical signal, such as a pulse or a digital signal, can be sufficiently decomposed to enable a path adjusting means provided integrally within a planar waveguide device to be used to compensate for dispersion. By selectively controlling the path-length means, for example, thermally, a range of dispersion in an optical signal can be compensated either actively in response to signal conditions, or by a pre-determined amount. In each case, the thermal adjustment may configure the path-length adjusting means to exhibit an appropriate refractive index along selected portions of an array of waveguides. The quadratic phase variation induces an opposite group delay variation to that originally present which results in the recombined signal having a narrower pulse profile than the incident signal.

Thus, the path length adjustor 20 produces in each pair of adjacent wavelengths, 18a, ..., f a group delay $\tau$ at the average of the two adjacent wavelengths $\lambda_{av}$, for example $\lambda_{av} = (\lambda_a + \lambda_b)/2$, that is equal to the difference in phase $\delta\phi$ between the two adjacent waveguides divided by the difference in optical angular frequency $\delta\omega$, i.e. $\tau(\lambda) = \delta\phi/\delta\omega$ when $\lambda = \lambda_{av}$.

There is a limit to the maximum phase change, $\delta\phi_{max}$, that can be introduced between adjacent waveguides 18a, ... f, which is determined by the increase in transmission loss that would otherwise result. This affects wavelengths that divide between two adjacent waveguides as the higher the relative phase difference between waveguides 18a, ..., f at output the higher the portion of their fields no longer in phase at the output, and the higher the transmission signal loss. In principle the loss may be reduced by increasing the number N of component signals and correspondingly reducing their wavelength separation $\Delta\lambda$.

For a given group delay dispersion, the maximum value of group delay $\tau$, proportional to $\delta\phi/\Delta\lambda$, is itself proportional to the operational bandwidth B, the bandwidth of the input signal $S_{in}$. Hence for some maximum allowable value of $\delta\phi$, $\Delta\lambda$ is proportional to 1/B. The number of waveguides 16a, ... f is $N=B/(\Delta\lambda+1)$, and is therefore approximately proportional to $B^2$. Typically values for B are 0.5 nm, with $\Delta\lambda=17$ pm. This gives a suitable value of $N=31$. Component signals for use in a dispersion compensator according to the invention can thus be resolved to $\Delta\lambda$ in the range, for example, of 10 pm to 30 pm, e.g. 16 pm.

The invention thus provides a means to compensate for dispersion which has not been feasible using earlier arrayed waveguide technology. Dispersion is compensated by splitting the signal into fractional differences in wavelength $\Delta\lambda/\lambda$ which are small compared to the ratio of the wavelength to the maximum group delay length and applying a small fractional adjustment $\delta\phi/\Delta\phi$ to the relative phase of each component signal.

Planar waveguide gratings possessing the ability to split a broadband signal into a large number of waveguides with the required level of sensitivity are now available, e.g. $\Delta\lambda=80$ pm. Such planar waveguide devices are able to decompose signals into over 160 waveguides. The invention implements advanced technology which enables an optical signal to be decomposed into a high enough number of component signals whose separation wavelengths $\Delta\lambda$ are sufficiently narrow.

Various embodiments of the path length adjustor 20 of the dispersive region 19 will now be described with reference to FIGS. 5A to 5D of the invention, in which the path length adjuster 20 comprises a lens or a lens equivalent. The term lens and/or lens equivalent is used here interchangeably to represent a region configured to ensure a suitable path length adjustment to an optical signal which is propagating along one of the waveguides in the second waveguide array 18a, ..., f to provide a corrective dispersion to the reconstituted signal $S_{out}$.

Figure 5A:
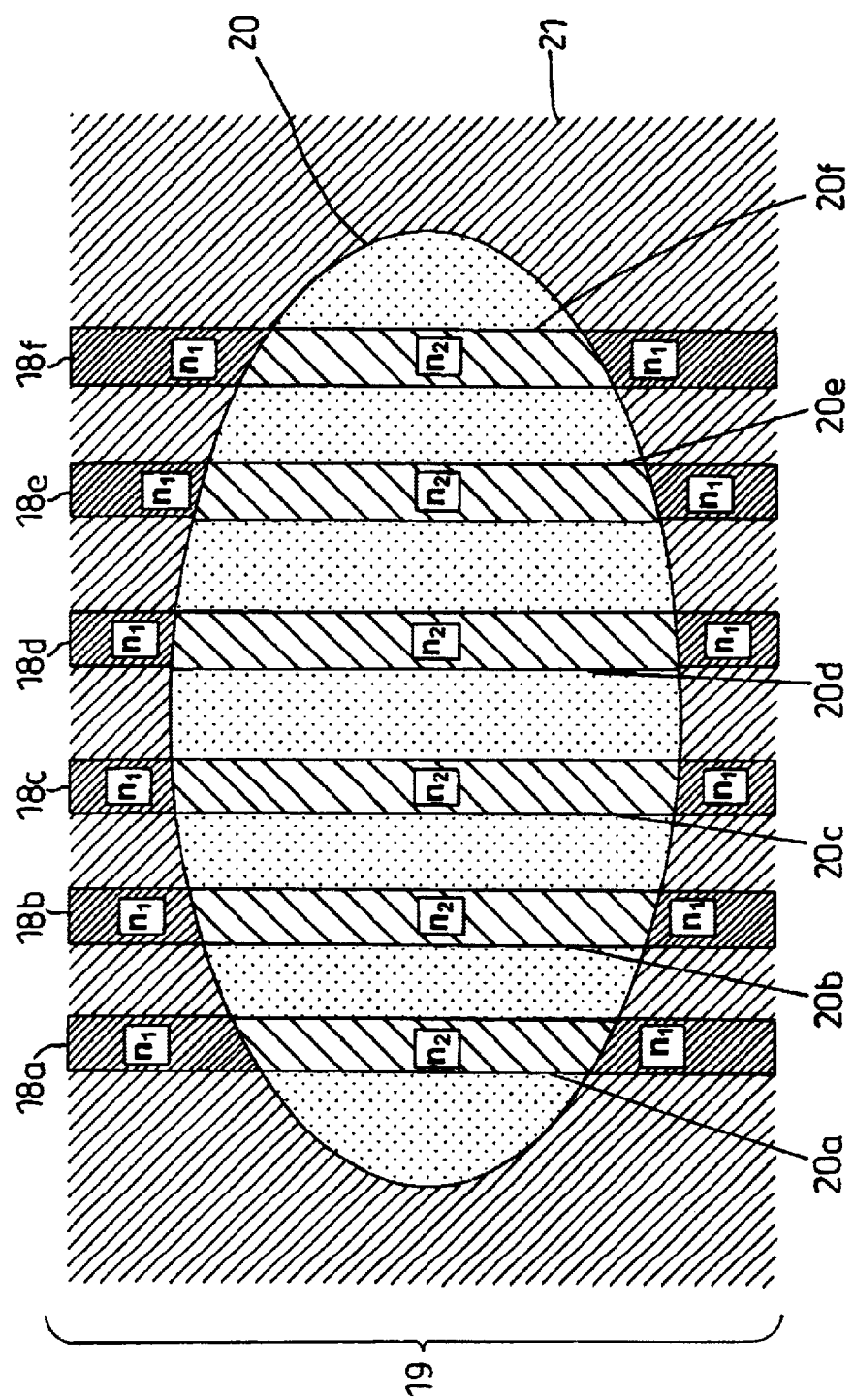
FIG. 5A shows a sketch of an enlarged section of FIG. 3B.
Figure 5B:
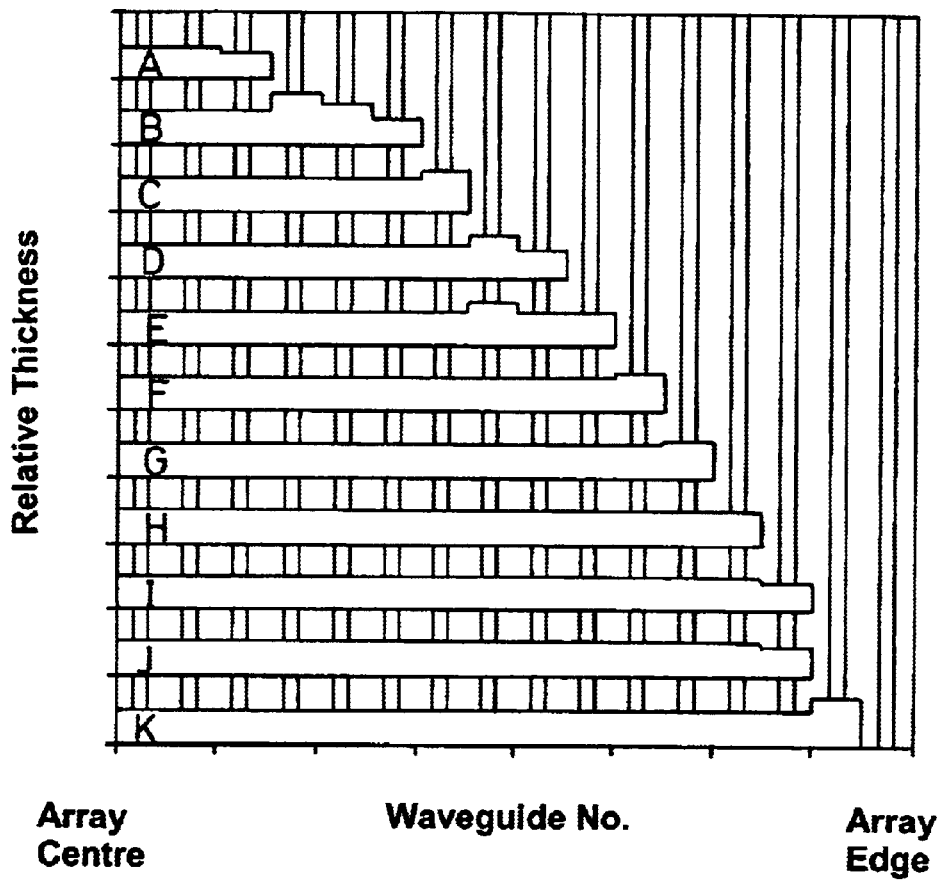
FIG. 5B sketches a range of strip lens configurations according to the invention.

In FIG. 5B the lens comprise at least one strip of material, or strip lens, having a predetermined refractive index whose collective configuration provides a lens-like function. The refractive index for each strip lens can be fixed and/or identical, and/or instead the refractive index/indices may be responsive to a control stimulus/stimuli, for example, a thermally responsive strip lens array may be provided such as is discussed in more detail herein below with reference to FIGS. 5C and 5D.

In FIG. 5A, path length adjuster 20 comprises an array of waveguide strip lens 20a, ..., f which have an adjustable refractive index $n_2$, and which can be made to differ from the refractive index $n_1$ of the waveguides 18a, ..., f, for example, by varying the temperature of the planar waveguide device 10 or chip.

FIG. 5B shows several strip lens provided across the waveguide array 16a, ..., f which have a variety of stepped edge profiles to approximate smoother lens boundary conditions.

The eleven strip lens 20a, ..., k shown in FIG. 5B illustrate a range of possible strip lens edge configurations. FIG. 5B sketches one half of a composite lens equivalent comprising a number of strip lens, A to K. In general, the properties of each strip lens 20a, 20b, 20c etc such as its refractive index, and/or shape and/or composition, and in particular the overall configuration of the path-length adjusting means 20 formed by strip lens 20a, 20b, 20c, ..., 20k and the refractive index of the strips, are selected to induce the desired relative phase-shift $\delta\phi$ between adjacent waveguides in the array 16a, ..., f. Typically, suitable materials for a strip lens will be polymer or polymer based material(s). As described above, the edge portions of the strips are graduated or stepped, and a variety of configurations may be adopted to ensure that the boundary of the path adjustor 20 has the desired level of smoothness.

The strip lens in the example of FIG. 5B have equal widths over the major portion of their lengths and are narrow enough such that the interruption of the waveguides causes very little radiation loss, for example, their widths are of the order of ten microns (10 $\mu$m). The sum of the path lengths for any component signal through all the strips a component signal negotiates must have a parabolic variation with wavelength. To achieve this, the width of the outermost one or more sections of each strip must be adjusted appropriately as FIG. 5B shows. The total number of waveguides N in the waveguide array 16 which cross the strip lens array 20 in the example shown by FIG. 5B, is 31. A half profile of each lens only is shown in FIG. 5B, the full lens may be symmetric or may be provided with a differently stopped edge profile.

The stepped profile in FIG. 5B is used for practical convenience only. Each strip may differ in thickness from adjacent strips if so desired. The stepped profile is usually aligned with a waveguide. In a specific embodiment the refractive index $n_2$ of the polymer forming the strips varies with respect to that of the silicon waveguide 18a ... f over a 40° C. temperature rise by approximately −0.017. The maximum combined thickness of all the strips at the centre of the lens is chosen to be about 100 $\mu$m. This provides in conjunction with the polymer index variation, a variation in group delay of approximately 500 ps/nm over an operational band width of 0.5 nm.

The path length adjuster(s) 20, 20a,b,c may be individually or collectively heated to adjust their refractive index/indices for each waveguide in embodiments where the lens refractive index/indices are thermally dependent. Alternatively, an electric field may be applied, or it is possible for some form of strain to be applied to the waveguides along a pre-determined section so as to adjust the refractive index to the desired value.

The path length adjuster 20 needs to be tuned appropriately to ensure that adequate dispersion compensation is provided. Fixed lens 20a,b,c etc require the refractive index of the strips to be very accurately specified with respect to the array and the lens would need to be operated at a temperature which is considerably higher than the highest temperature the planar waveguide device or chip would normally experience (which might be considerable if temperature variation were also used to tune the channel pass bands). This has obvious power disadvantages.

The lens 20a,b,c, ..., k etc may be formed instead by varying the propagation length of the component signals in a uniform material of different refractive index from the silica. An alternative would be to form the lens by varying the refractive index for the component signals over a fixed propagation length. This design may be realised in a similar form to that illustrated in FIG. 5B if all the channels negotiate an equal number of strips of polymer but if the refractive index of each strip is made to vary in a parabolic way between the centre and the edge of the strip. The strips may then be made to have constant width and may be equal in length. The properties of the lens are then defined entirely by the material forming the strips and the refractive index of the material between the strips has no effect on the characteristics of the lens. This has the advantage that the refractive index of the material in the strips no longer has to be specified precisely relative to that of the silica waveguides. The variation in refractive index may be produced by varying the temperature of the polymer in a parabolic way over the length of the strip. The degree of dispersion compensation is then determined by the magnitude of the parabolic distribution. This method of thermal tuning has the advantage that only the difference in temperature between the centre and the edge of the waveguide array has to be adjusted and the behaviour is substantially independent of the absolute temperature that may be determined by the additional requirement for tuning the channels.

Figure 5C:
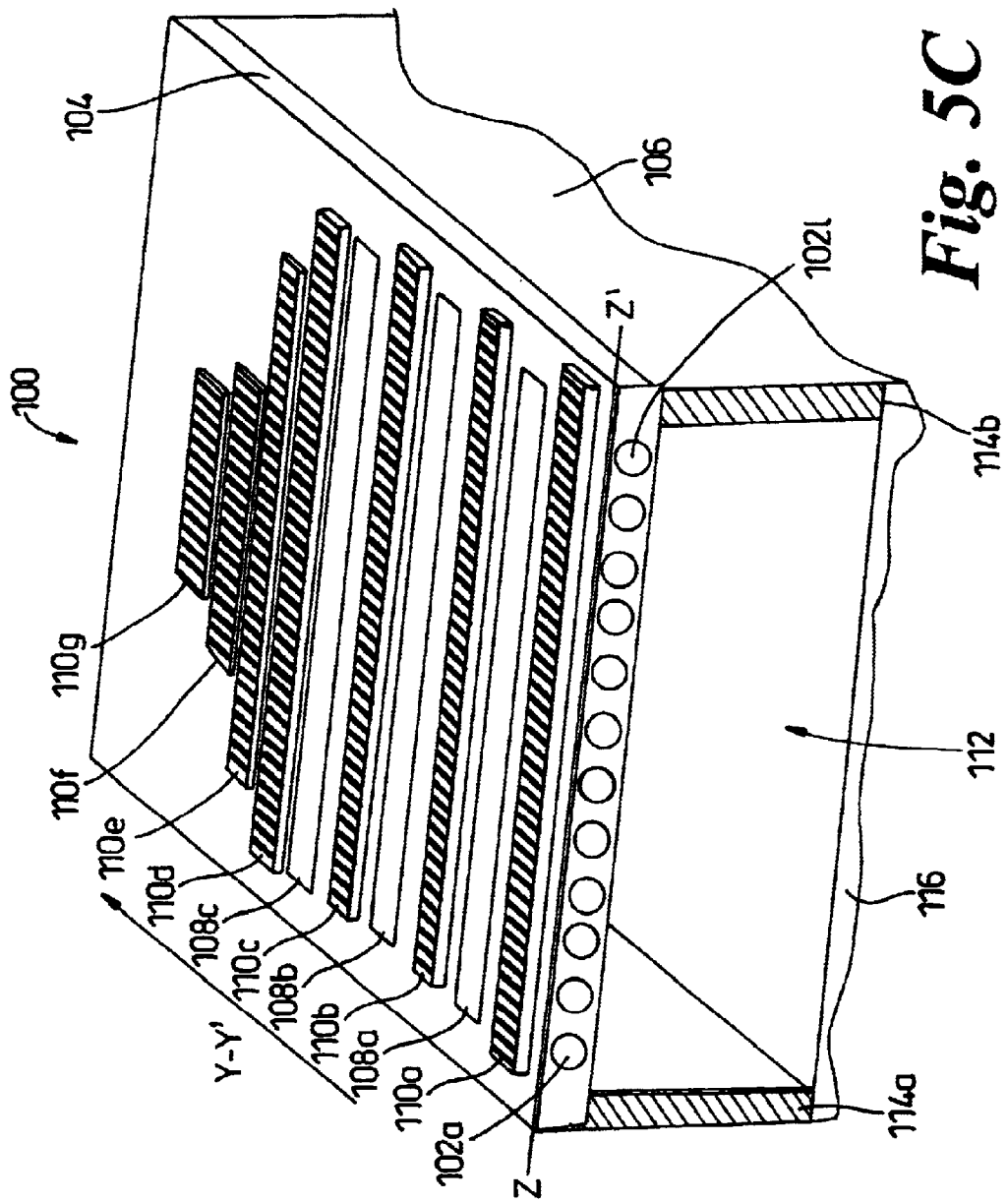
FIG. 5C shows a cut-away view strip lens configuration according to another embodiment of the invention.

FIG. 5C of the accompanying drawings, is a sketch of an embodiment of a planar waveguide dispersion compensator 100 in which the path length adjuster comprises a series of strip lens 100a,b,c which are thermally responsive. FIGS. 5E and 5F provide front and plan views of the compensator sketched in FIG. 5 respectively. Heater(s) 110a, . . . , shown in FIG. 5C are provided in the vicinity of each strip lens, 108a,b,c to adjust the refractive index/indices of the strip lens array. A suitable temperature controller is provided to control the heater(s) and feedback means may be provided to ensure the temperature of the lens are suitably adjusted. Other embodiments of the invention may provide means to adjust each lens refractive index individually and/or the array of strip lens collectively.

In FIG. 5C, the dispersion compensating region 19 of a planar waveguide device 100 is shown in a cut-away view along Z–Z'. In FIG. 5C, an array of twelve waveguides 102a, . . . , l is embedded in a silica layer 104 which is supported by a silicon substrate 106. Path length adjustment is provided by an array of strip lens elements 108a,b,c etc which traverse the waveguide array 102. Each strip lens element 108a,b,c comprises a polymer type material whose refractive index is dependent on temperature. The strip lens array 102 is formed by providing a series of grooves of equal length across the embedded waveguide array 102 in silica layer 104, which are then filled with the strip lens polymer material. Such grooves and the deposition of the strip lens material may be provided using conventional techniques such as are known to those skilled in the art. It will be appreciated that only three strip lens have been shown in FIGS. 5C,5E and 5F for clarity and that no limitation is intended by this illustrative example.

Heaters 110a, . . . g are provided to adjust the temperature of the strip lens 108a,b,c and modify the refractive index of the strip lens. As shown in FIG. 3D, each heater 110a,b,c,d is adjacent a strip lens and is positioned over the silica layer 104 in the vicinity of the strip lens. The silicon substrate is removed underneath the heaters 110a,b,c,d and is replaced by a thermally insulating layer 112. Heat therefore permeates down through the silica layer 104 and must then traverse the silica laterally before being absorbed by the silicon substrate 106 at the edges of the waveguide array 102 (indicated by silicon substrate regions 114a,b in FIG. 5C). This produces a lateral temperature distribution which peaks at the centre of the waveguide array and is approximately parabolic. The heaters 110a, . . . , g may be individually or collectively controlled and are connected to a suitable power source. Feedback means to regulate their behaviour may be provided.

The heat channelling element 112 shown in FIG. 5C therefore comprises an insulating region formed in the silicon substrate 106 beneath the silica layer 104 and heater 110a,b,c,d and waveguide 102 arrays. The silicon substrate regions 114a,b abut the heat channelling element 112 which is supported by on a base layer 116. The heat channelling element 112 is formed by creating a void in the substrate, shown in FIG. 5C. The void may be formed, for example, by using an etching technique such as is known to those skilled in the art, and in the best mode contemplated by the inventor is then filled with a suitable insulting material, for example, a polymer type material which has the desired heat channelling properties. The silica layer 104 in which the waveguide array 102 is provided is thus substantially thinner and the heat flow from the heaters 110 directed towards the strip lens is increased.

Figure 5D:
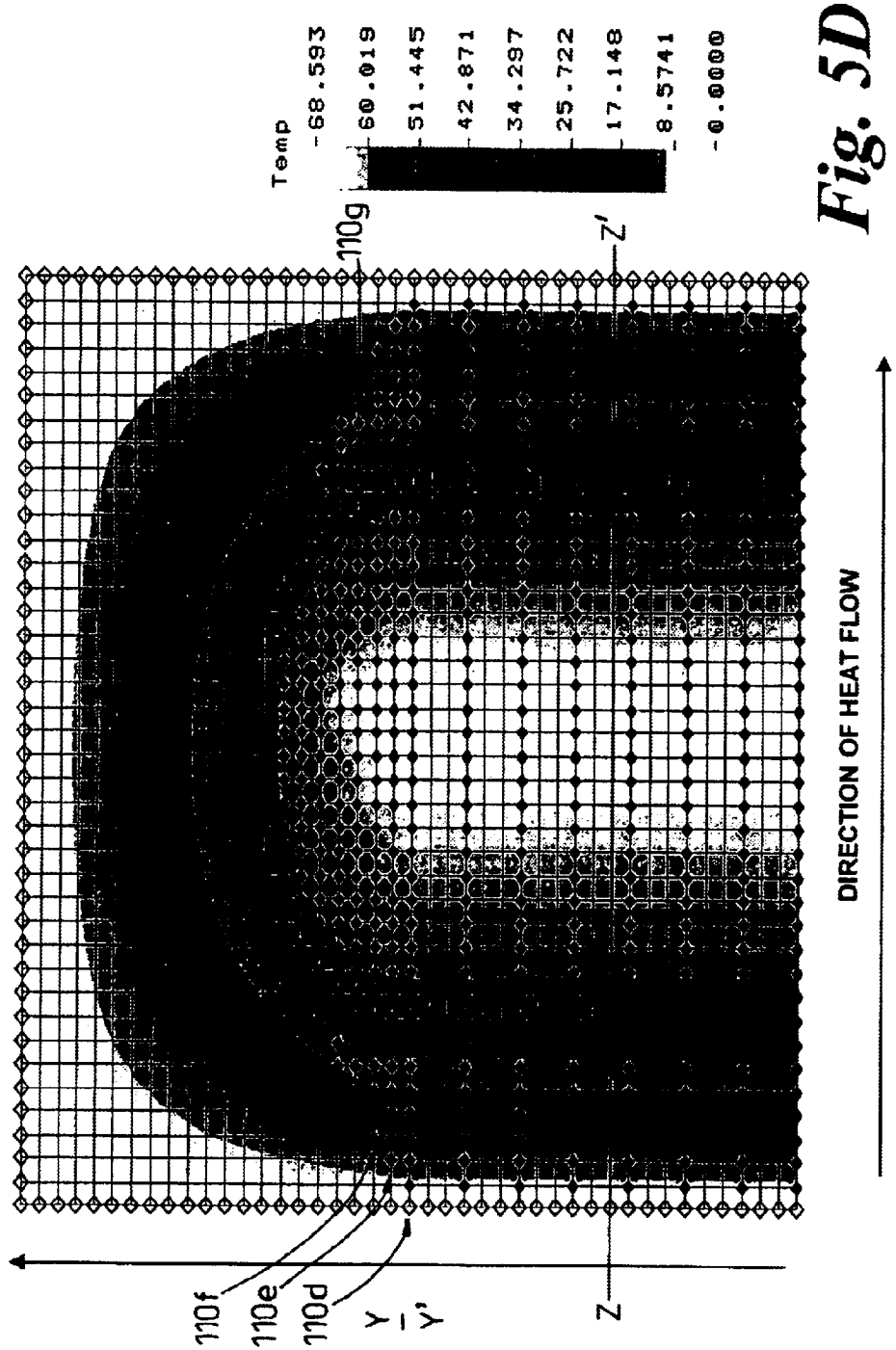
FIG. 5D sketches a typical heat profile across a strip lens array such as are shown in FIGS. 5C, 5E and 5F for providing dispersion compensation according to the invention.

The portion of the silicon substrate 106 that is removed to form the heat channelling element 112 is extended in the longitudinal direction Y–Y' beyond the part occupied by the strip lens array 108a,b,c etc. However, unless the additional length is very large, for example of the order of $10^{-2}$ m, some heat flows longitudinally to the silicon heatsink. To compensate for the lowering of temperature in the last strips that would otherwise occur, additional heaters 110e,f,g are incorporated at the boundary such as is shown in FIGS. 5C and D. FIG. 5D represents half of the region where the silicon is removed, being symmetrical about its base line to provide appropriate boundary conditions in the opposite Y–Y' direction (see FIG. 5 for example). This figure also shows isothermals of the resulting steady state temperature distribution. The heater strips are represented by rows of diamond shaped dots that correspond to individual sources of heat in the model used to analyse the behaviour of the lens. In the embodiment shown in FIG. 5D, seven strips for example, could be provided between pairs of heaters (i.e. between the rows of diamond shaped dots). Seven additional heaters of successively reducing lengths are added beyond the main set of equal length heater strips to provide temperature compensation. The isotherms normal to the heater array over the strip lens region indicates that effective, regulated compensation can be provided. It will be appreciated that FIGS. 5C, E and F do not show all the heaters of FIG. 5D. Moreover, FIG. 5F shows a second set of boundary heaters 110h,i,j not visible in the views shown in FIG. 5C and FIG. 5D.

The temperature of the polymer lens can be adjusted using any suitable thermal control apparatus, and appropriate feedback means can be provided to regulate the heater operation.

Advantageously, this embodiment of the invention provides a highly responsive thermal lens-type device, in which power for a given amount of temperature rise is reduced compared to lens-type devices in which no heat channelling element is provided, for example, if all the silicon substrate is retained. A variety of temperature distributions may thus be achieved in a planar waveguide dispersion compensator, for example, an inverted parabolic temperature distribution as required by the thermal lens above (see FIG. 5D) or another distribution which exhibits a maxima or broad-peak, for example, a "hump", triangle, or rectangle.

The invention thus provides a means of dynamically controlling the profile of an optical signal in the optical layer by providing a physical implementation of a dispersion compensating medium which has an appropriate functional relationship between the component signals wavelength $\lambda$ and the relative phase shift $\Delta\phi$.

Whilst the above embodiment is contemplated for the purposes of pulse narrowing, pulse reshaping generally may be provided, particularly in the case where the refractive index of the path-length adjusting means is individually controlled for each waveguide. Moreover if further feedback means are provided to dynamically control the phase shift of each 18a, . . . , f waveguide in the region of dispersion 19, distortion in an optical pulse profile can be automatically corrected within the optical layer.

As the wavelength spacing $\Delta\lambda$ and the passband $\delta\lambda$ for each component signal are both fixed per device, a desired amount of adjustment to the group velocity, and the resulting dispersion control, is obtained by controlling the path-length adjusting means 20. For example, the phase-shifts induced could be adjusted by actively varying the refractive index of the polymer material, or otherwise controlling the phase-shifts induced by the path-length adjusting means. For example, for thermally responsive path-length adjusting means 20, thermal effects can be used. Alternatively, an electric control mechanism could be implemented to vary the refractive index of a suitably responsive material, or other suitable means may be used, for example, the Kerr effect in which the intensity of a signal affects the refractive characteristics of a medium through which the signal propagates.

For the purposes of ensuring dispersion compensation, it is likely that a quadratic variation of phase will be normally sufficient for inducing the desired variation of group delay with wavelength. This will ensure that by appropriate control of the quadratic phase shift, i.e., the amount of minimum dispersion, sufficient variation of group delay can be provided to induce the recombined signal to display a narrower profile than the input signal. However, other functional variations in phase may be adopted to compensate for group delay dispersion in alternative embodiments by suitably modifying the characteristics of the lens or lens equivalent.

The path length adjuster 20 can thus control the path adjustment for each waveguide 18a, ..., f in a selective manner, or control the path length for all waveguides 18a, ..., f collectively. Either way, the adjustment implemented is selected to induce a desired alteration of the group delay profile of the incident signal.

Several other alternative embodiments of the invention will be apparent to those skilled in the art, and the scope of the invention is intended to be that covered by the claims.

Moreover it is obvious to a person skilled in the art, that in the embodiments incorporating reflector means, the component signals pass twice through the dispersion compensating region whereas in other embodiments (e.g. as illustrated in FIG. 4B) the component signals pass only once through the dispersion compensating region, and the amounts of induced phase shifts must be determined accordingly.

Whilst the above embodiments have been described in the context of a planar device, functionally analogous components can be implemented in fiber and vice versa and the invention is intended to extend to both where such an equivalence is obvious to the skilled man in the art.

As is obvious to those skilled in the art, the dispersion compensator may be pre-adjusted to an initial or fixed level of compensation or dynamically adjusted in situ to a fixed level. Dynamic phase adjustment in situ in response to changing levels of signal dispersion may also be provided by the invention. Signals moreover may be circulated iteratively through the dispersion compensator to receive the desired level of dispersion compensation.

Moreover, in other embodiments of the invention, the strip lens providing path length adjustment may have differing initial refractive indices and/or have refractive indices which have differing thermal response.

The term adjacent component signals implies component signals having adjacent passbands, which may or may not overlap in wavelength.

The text of the abstract is incorporated below as part of the description.

A planar dispersion compensator for an optical signal is provided. The compensator decomposes an inputted optical signal into N component signals separated by a fractional wavelength δλ. each component signal has its path-length adjusted to induce a sufficient phase shift between input and output to change the group delay of the optical signal when recombined from each of the component signals. In this manner, pulsebroadening can be compensated by selectively varying the induced phase shifts to produce the desired level of opposite group delay. Portions of the substrate of the planar waveguide are removed to improve thermal responsiveness of the path-length adjustment means.

It will be appreciated by those skilled in the art that the resolution provided by optical signal decomposing means, e.g., the first waveguide array, must be sufficient to enable adequate dispersion compensation to be achieved. For example, a resolution of 10 to 20 picometers limits the relative phase shifts induced by the optical dispersion means to below 360°, whereas a higher resolution enables a higher relative phase shift to be accomodated and so increases the effectivenes of the dispersion compensation.

What is claimed is:

1. An adjustable dispersion compensator for an optical signal comprising:

optical signal input means to receive said optical signal as input;

optical signal decomposing means connected to said input means and arranged to decompose the optical signal into a plurality of component signals, each component signal having a different passband from an adjacent component signal;

optical dispersion means having variable optical path-length adjuster arranged to receive each said component signal with an initial phase and configured to adjust the optical path length of at least one said component signal to induce a phase shift in said component signal on output; and an optical signal combiner arranged to re-combine the component signals output by said path-length adjuster into a re-combined signal, wherein the phase shift of each component signal is selected to correct in the recombined signal any dispersion present in the inputted optical signal.

2. An adjustable dispersion compensator as claimed in claim 1, wherein said optical signal decomposing means comprises a first array of M waveguides and said optical dispersion means comprises a second array of N waveguides and said compensator further includes: a first 1:M coupler connected to said signal input means and splitting said inputted optical signal along said first array of waveguides; and a second M:N coupler connected to said first array of waveguides and to said second array of waveguides and arranged to decomposed optical signals from said first array of waveguides into said component signals.

3. An adjustable dispersion compensator as claimed in claim 1, wherein the path-length adjuster comprises at least one lens having a refractive index which is capable of differing from the refractive index of the waveguide along which a component signal is propagating.

4. An adjustable dispersion compensator as claimed in claim 1 provided as a planar waveguide device, wherein the path-length adjuster comprises at least one strip lens embedded in a first layer of said waveguide device, wherein each said strip lens has a refractive index which is capable of differing from the refractive index of the waveguide along which a component signal is propagating, wherein a heat channeling element is provided in a second layer below said first layer.

5. An adjustable dispersion compensator as claimed in claim 1, wherein the induced phase shift of each component signal is a quadratic function of the wavelength of each component signal.

6. An adjustable dispersion compensator as claimed in claim 2, wherein the signal combiner comprises said first coupler, the compensator further comprising a reflector arranged to reflect phase-shifted component signals back along their incident optical paths.

7. An adjustable dispersion compensator as claimed in claim 2, wherein the signal combiner further includes:
   a N:P coupler connected to said path length adjuster and to a third array of P waveguides; and
   a P:1 coupler connected to said third array of waveguides and arranged to combine the phase shifted component signals into a single signal.

8. An adjustable dispersion compensator as claimed in claim 1, wherein the path length adjuster has at least one thermal characteristic affecting the path-length of at least one component signal, and the dispersion compensator further includes thermal control means controlling the path adjustment means.

9. An adjustable dispersion compensator as claimed in claim 1, further including a polarization adjuster to adjust the polarization of the component signals.

10. A method of compensating for dispersion in an optical signal comprising the steps of:
    decomposing the optical signal into component signals having differing passbands;
    inducing a variable phase-shift in each component signal by adjusting the optical path of each component signal relative to each other; and
    combining component signals into a combined optical signal, wherein the induced phase shift is selected to provide a dispersion correction in said combined signal.

11. A method as claimed in claim 10, further including the step of selecting the induced phase shift for each component signal to be a quadratic function of the wavelength of each component signal.

12. A method of compensating for dispersion as claimed in claim 10, further including the step of selecting the induced phase shift of each component signal to adjust the width of a pulse profile of the combined optical signal relative to the initial optical signal.

13. A method of compensating for dispersion as claimed in claim 10, further including the step of adjusting the phase of each component signal using thermally dependent path-length adjusting means to adjust the relative path-length of the component signals.

14. An optical transmission system including an adjustable dispersion compensator for an optical signal, the compensator comprising:
    optical signal input means to receive said optical signal as input;
    optical signal decomposing means comprising at least one array of waveguides connected to said input means and arranged to decompose the optical signal into a plurality of component signals, each component signal having a different passband from an adjacent component signal;
    optical dispersing means having a variable optical path-length adjuster arranged to receive each said component signal with an initial phase and configured to adjust the optical path length of at least one said component signal to induce a phase shift in said component signal on output; and
    an optical signal combiner arranged to re-combine the component signals output by said path-length adjuster into a re-combined signal, wherein the phase shift of each component signal is selected to correct in the recombined signal any dispersion present in the inputted optical signal.

15. A path length adjuster for a dispersion compensator, the path length adjuster comprising a plurality of planar waveguide strip lens, the strip lens comprising:
    a middle portion of substantially uniform thickness; and at least one end portion having a different thickness from said middle portion.

16. A path length adjuster as claimed in claim 15, wherein at least one end portion of at least one step length has a stepped profile.

17. An adjustable dispersion compensator for a pulsed optical signal comprising:
    an optical signal decomposer arranged to separate an inputted optical signal into a plurality of component signals having different passbands and optical paths;
    a variable path length adjustor arranged to adjust the optical path length of each component signal by a pre-determined amount; and
    an optical signal combiner to recombine said optical path-adjusted signals into a recombined optical signal, wherein the amount of optical path length adjustment is sufficient to provide a dispersion correction to said recombined optical signal.

18. An adjustable dispersion compensator for a pulsed optical signal including:
    an optical signal decomposer arranged to separate an inputted optical signal into a plurality of component signals having different passbands and optical paths;
    a temperature responsive path length adjuster arranged to adjust the optical path length of each component signal by a pre-determined amount;
    temperature control means for said path length adjuster arranged to control the temperature of said path length adjuster; and
    means to recombine said optical path-adjusted signals into a recombined optical signal, wherein the amount of optical path length adjustment is sufficient to provide a dispersion correction to said recombined optical signal.

19. An adjustable dispersion compensator for a pulsed optical signal comprising:
    an optical signal decomposer arranged to separate an inputted optical signal into a plurality of component signals having different passbands and optical paths;
    a variable path length adjustor arranged to adjust the optical path length of each component signal; and
    an optical signal combiner to recombine said optical path-adjusted signals into a recombined optical signal, wherein the optical path length adjustment provides a dispersion correction to said recombined optical signal.

20. An adjustable planar waveguide dispersion compensator for a pulsed optical signal including:
    a optical signal decomposer provided within a silica layer of said planar waveguide and arranged to separate an inputted optical signal into a plurality of component signals having a different passbands and optical paths;
    a temperature responsive path length adjuster arranged to adjust the optical path length of each component signal by a predetermined amount and provided in said silica layer;

temperature control means for said path length adjuster arranged to control the temperature of said path length adjuster;

a heat channeling element arranged to increase the amount of heat flowing from said temperature control means to said path length adjuster; and means to recombine said optical path-adjusted signals into a recombined optical signal, wherein the amount of optical path length adjustment is sufficient to provide a dispersion correction to said recombined optical signal.

21. A method of thermally tuning a dispersion compensator as claimed in claim 18 or 20, comprising the steps of:

a) thermally tuning said passbands of said decomposed signals; and b) thermally tuning said path length adjuster to adjust the optical path length to provide a desired level of dispersion correction.

22. An adjustable dispersion compensator for an optical signal comprising:

an arrayed waveguide grating (AWG) having a number M of waveguides, the AWG decomposing the optical signal into N component signals each having a separation wavelength $\delta\lambda$ from an adjacent component signal;

at least one path-length adjustment means varying the path-length of at least one of said N component signals to induce a phase shift $\Delta\phi$ between the initial phase of each component signal in the AWG waveguides and the final phase of each component signal output by the AWG waveguides; and re-combination means to re-combine the phase-shifted component signals into a re-combined signal, wherein the phase shift $\Delta\phi$ of each component signal is selected to adjust at least one characteristic of the optical signal in the re-combined signal.

* * * * *